(12) United States Patent
Sethuraj et al.

(10) Patent No.: US 11,441,809 B2
(45) Date of Patent: Sep. 13, 2022

(54) AUXILIARY ECONOMIZER FOR AN HVAC SYSTEM

(71) Applicant: Johnson Controls Technology Company, Auburn Hills, MI (US)

(72) Inventors: Rammohan Sethuraj, Tuticorin (IN); Pankaj D. Nalamwar, Digras (IN); Shashank B. Kadam, Pune (IN); Sriram Ramanujam, Pune (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 471 days.

(21) Appl. No.: 16/279,790

(22) Filed: Feb. 19, 2019

(65) Prior Publication Data

US 2020/0263899 A1 Aug. 20, 2020

Related U.S. Application Data

(60) Provisional application No. 62/806,157, filed on Feb. 15, 2019.

(51) Int. Cl.
| | |
|---|---|
| *F24F 12/00* | (2006.01) |
| *F24F 13/14* | (2006.01) |
| *F24F 110/12* | (2018.01) |
| *F24F 140/50* | (2018.01) |

(52) U.S. Cl.
CPC .......... *F24F 12/001* (2013.01); *F24F 13/14* (2013.01); *F24F 2012/007* (2013.01); *F24F 2110/12* (2018.01); *F24F 2140/50* (2018.01)

(58) Field of Classification Search
CPC ...... F24F 12/001; F24F 13/14; F24F 2110/12; F24F 2012/007; F25B 2400/13
See application file for complete search history.

(56) References Cited

U.S. PATENT DOCUMENTS

| | | | | |
|---|---|---|---|---|
| 5,709,100 A | * | 1/1998 | Baer | F25D 19/04 62/259.2 |
| 7,270,691 B2 | * | 9/2007 | Arts | A61L 9/16 55/385.2 |
| 8,141,374 B2 | | 3/2012 | Hay | |
| 8,578,726 B2 | | 11/2013 | Hay | |
| 9,032,742 B2 | * | 5/2015 | Dunnavant | F24F 12/006 62/89 |
| 10,869,410 B1 | * | 12/2020 | Perdew | F24F 13/30 |
| 2003/0111219 A1 | * | 6/2003 | Edwards | F24F 12/006 165/208 |
| 2004/0093880 A1 | * | 5/2004 | Zheng | B60H 1/3214 62/199 |
| 2006/0054302 A1 | * | 3/2006 | Cho | F24F 12/006 165/8 |
| 2007/0205297 A1 | * | 9/2007 | Finkam | F24F 11/30 236/1 C |

(Continued)

FOREIGN PATENT DOCUMENTS

WO 2008130359 A1 10/2008

*Primary Examiner* — Miguel A Diaz
(74) *Attorney, Agent, or Firm* — Fletcher Yoder, P.C.

(57) ABSTRACT

A heating, ventilation, and/or air conditioning (HVAC) unit may include a supply fan section having a supply fan disposed therein to force a supply air flow through a discharge plenum of the HVAC unit. The HVAC unit may also include an economizer positioned adjacent the supply fan section to receive an outdoor air flow and direct the outdoor air flow into the supply fan section.

25 Claims, 8 Drawing Sheets

(56) References Cited

U.S. PATENT DOCUMENTS

| | | | |
|---|---|---|---|
| 2010/0154448 A1* | 6/2010 | Hay | G06F 1/20 62/175 |
| 2011/0079024 A1* | 4/2011 | Hakbijl | F24F 12/003 62/56 |
| 2011/0308265 A1* | 12/2011 | Phannavong | F24F 12/001 62/160 |
| 2012/0174615 A1* | 7/2012 | Cho | F25B 31/004 62/468 |
| 2014/0096547 A1* | 4/2014 | Boehde | F24F 1/50 62/89 |
| 2015/0369527 A1 | 12/2015 | Ghadiri Moghaddam et al. | |
| 2016/0018115 A1* | 1/2016 | Arjomand | F25D 23/12 454/204 |
| 2016/0169544 A1* | 6/2016 | Fischer | F24F 11/0001 165/251 |
| 2017/0321917 A1 | 11/2017 | Nickel et al. | |
| 2018/0187915 A1 | 7/2018 | Nelson | |
| 2020/0256572 A1* | 8/2020 | Bjorn | F24F 11/65 |
| 2020/0284464 A1* | 9/2020 | Abdel-Salam et al. | F24F 5/0035 |
| 2020/0413571 A1* | 12/2020 | Perdew | H05K 7/20745 |

\* cited by examiner

AUXILIARY ECONOMIZER FOR AN HVAC SYSTEM

CROSS REFERENCE TO RELATED APPLICATIONS

This application claims priority from and the benefit of U.S. Provisional Application Ser. No. 62/806,157, entitled "AUXILIARY ECONOMIZER FOR AN HVAC SYSTEM," filed Feb. 15, 2019, which is hereby incorporated by reference in its entirety for all purposes.

BACKGROUND

The present disclosure generally relates to heating, ventilation, and/or air conditioning (HVAC) systems and, more particularly, to an auxiliary economizer incorporated within an HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An HVAC system generally facilitates air flow to a conditioned space within a building or residence via one or more blowers. Further, the air flow may be drawn from the conditioned space, for example via return air ductwork, and/or from the environment, for example via an economizer. The economizer may allow ventilation of the conditioned space with the environmental air. Further, the HVAC system may condition a return air flow and/or the environmental air, for example, by directing the air flow through one or more heat exchangers and/or other HVAC sections. In some scenarios, directing the environmental air through multiple sections of the HVAC system may cause a pressure drop along the air flow path, and, thus, decrease a flow rate of the air flow and/or increase current draw of the blowers.

SUMMARY

This section provides a brief summary of certain embodiments described in the present disclosure to facilitate a better understanding of the present disclosure. Accordingly, it should be understood that this section should be read in this light and not to limit the scope of the present disclosure. Indeed, the present disclosure may encompass a variety of aspects not summarized in this section.

The present disclosure relates to a heating, ventilation, and/or air conditioning (HVAC) unit. The HVAC unit may include a supply fan section having a supply fan disposed therein to force a supply air flow through a discharge plenum of the HVAC unit. The HVAC unit may also include an economizer positioned adjacent the supply fan section to receive an outdoor air flow and direct the outdoor air flow into the supply fan section.

The present disclosure also relates to an economizer, which may include an air inlet to receive an environmental air flow and an air outlet to direct the environmental air flow into a heating, ventilation, and/or air conditioning (HVAC) unit proximate a blower section of the HVAC unit, such that the environmental air flow bypasses an evaporator coil of the HVAC unit prior to being discharged via a plenum section of the HVAC unit. The economizer may also include a damper to regulate a flow rate of the environmental air flow from the air inlet to the air outlet.

The present disclosure also relates to a heating, ventilation, and/or air conditioning (HVAC) unit, which may include a first economizer to direct a first environmental air flow into an air flow path of the HVAC unit and a second economizer to direct a second environmental air flow into the air flow path. The HVAC unit may also include a conditioning section having a heat exchange component. The conditioning section may be disposed between the first economizer and the second economizer, relative to a direction of air flow through the air flow path, and the heat exchanger component may condition the air flow.

BRIEF DESCRIPTION OF THE DRAWINGS

Various aspects of the present disclosure may be better understood upon reading the detailed description and upon reference to the drawings, in which.

DETAILED DESCRIPTION

Figure 1:
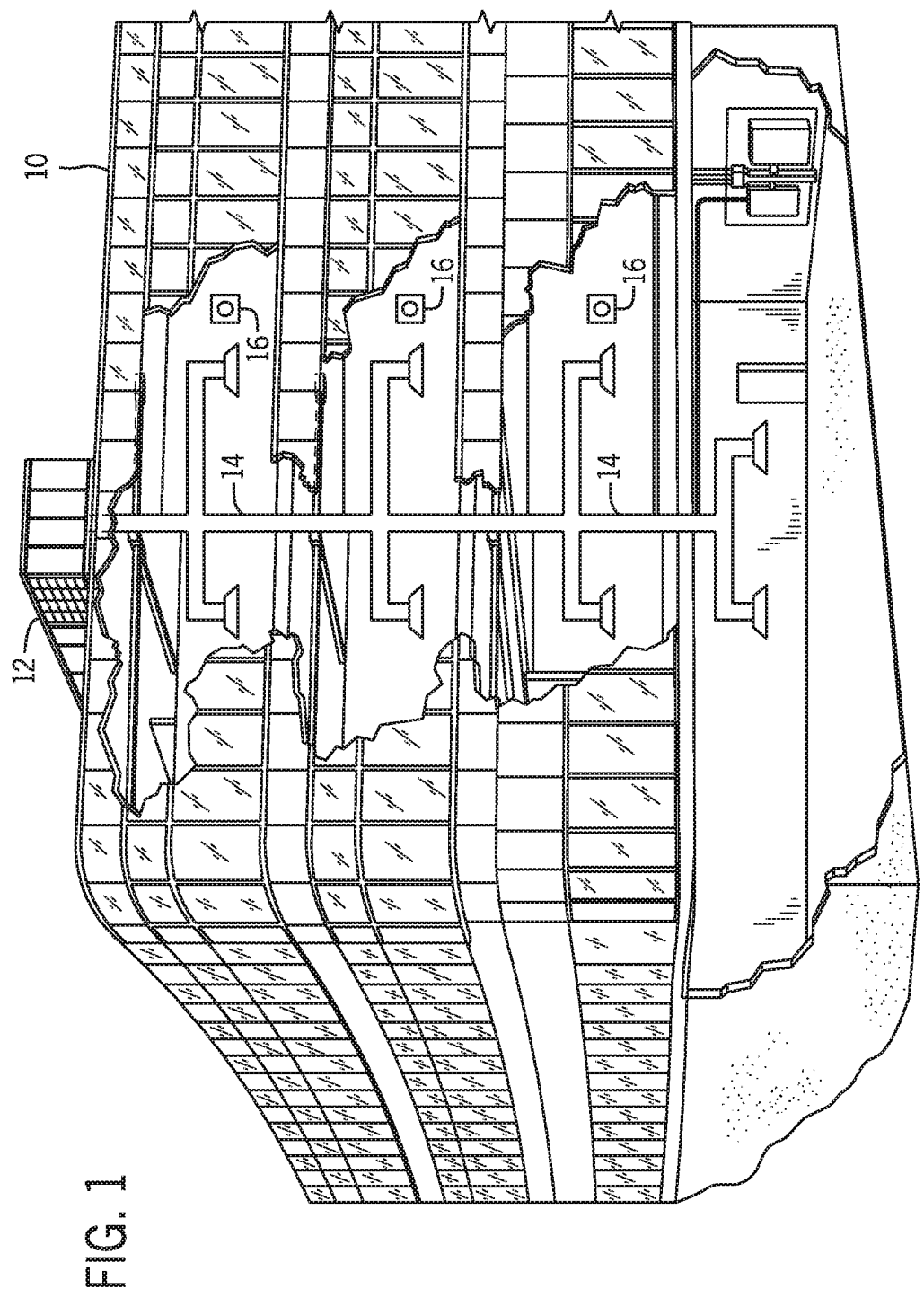
FIG. 1 is a partial cross-sectional view of an embodiment of a building that includes a heating, ventilation, and/or air conditioning (HVAC) system, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, heating, ventilation, and/or air conditioning (HVAC) systems generally include one or more fans or blowers to force an air flow through the HVAC system and to a conditioned space within a building or residence. For example, the air flow may pass over heat exchanger coils, such as condenser coils or evaporator coils, and/or through ductwork to or from such heat exchanger coils. Further, the air flow may be drawn from the conditioned space, for example via return air ductwork, and/or from the environment, for example via an economizer. The economizer may allow ventilation of the conditioned space with environmental air. Additionally, the HVAC system may condition the return air flow and/or the environmental air, for example, by directing the air flow through one or more sections of the HVAC system, such as a section containing the heat exchanger coils. Furthermore, the air flow may pass through other sections of the HVAC system, such as a filter section, an energy recovery wheel section, or other HVAC section within the air flow path of the HVAC system. In some scenarios, the flow of air through multiple sections of the HVAC system may cause a pressure drop along the air flow path, which may decrease the air flow volume and/or increase current draw of the blowers. Embodiments of the presents disclosure include an HVAC system having an auxiliary economizer positioned proximate a blower section of the HVAC system, for example without other sections in between, which enables and provides for an air flow path of less resistance, thereby decreasing the pressure drop along the air flow path.

In some embodiments, the HVAC system may be operable in one of multiple modes of operation. For example, the HVAC system may operate in a circulating mode, where the air flow directed through the HVAC system and to the conditioned space is entirely or substantially entirely return air from the conditioned space. Further, the return air may be conditioned, such as heated or cooled, by the HVAC system or may be circulated to the conditioned space without conditioning. Furthermore, the amount of conditioning imparted to the air flow may be tiered or adjusted, for example, according to a percentage of the heating or cooling capacity of the HVAC system or according to a control variable, such as a thermostat setting. In some embodiments, the capacity percentage of the HVAC system, such as 0 percent, 25 percent, 50 percent, 75 percent, or 100 percent, may correspond to a current draw or load of a compressor or heater, such as a gas or electric heating element.

Additionally, the HVAC system may operate in a mode that introduces environmental air drawn into the air flow via an economizer of the HVAC system. For example, the HVAC system may operate in an economizer mode or free cooling mode. In the economizer mode, a portion of the air flow directed through the HVAC system is gathered from the environment and mixed with the return air flow drawn from the conditioned space to create a mixed air flow. Further, in some embodiments, a portion of the return air flow may be exhausted to the environment. The mixed air flow may be of any suitable ratio such as 10 percent, 20 percent, 50 percent, 75 percent, or 90 percent environmental air, and may be conditioned or not, depending, for example, on the environmental conditions and/or control variables, such as a thermostat setting. Furthermore, in a free cooling mode, the HVAC system may direct a non-conditioned air flow to the conditioned space, where the non-conditioned air flow consists of entirely or substantially entirely environmental air.

In some embodiments, an auxiliary economizer may enable environmental air to be drawn into the HVAC system proximate a blower section of the HVAC system. For example, the auxiliary economizer may introduce the environmental air into the HVAC system downstream of a heat exchanger, relative to a direction of air flow through the HVAC system, in order to decrease resistance in the environmental air flow path and, thus, increase the total air flow supplied to the conditioned space and/or reduce the load of a blower configured to force air flow through the HVAC system. For example, by introducing the environmental air into the HVAC system closer to a supply air outlet of the HVAC system, a lesser volume of air flows through certain sections of the HVAC system, such as the energy recovery wheel section and/or heat exchanger coil section, and the environmental air effectively bypasses such sections. As a result, the pressure drop associated with the return air flow through the intervening sections may be reduced. Furthermore, the pressure drop experienced by the environmental air flow introduced into the HVAC system is reduced.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
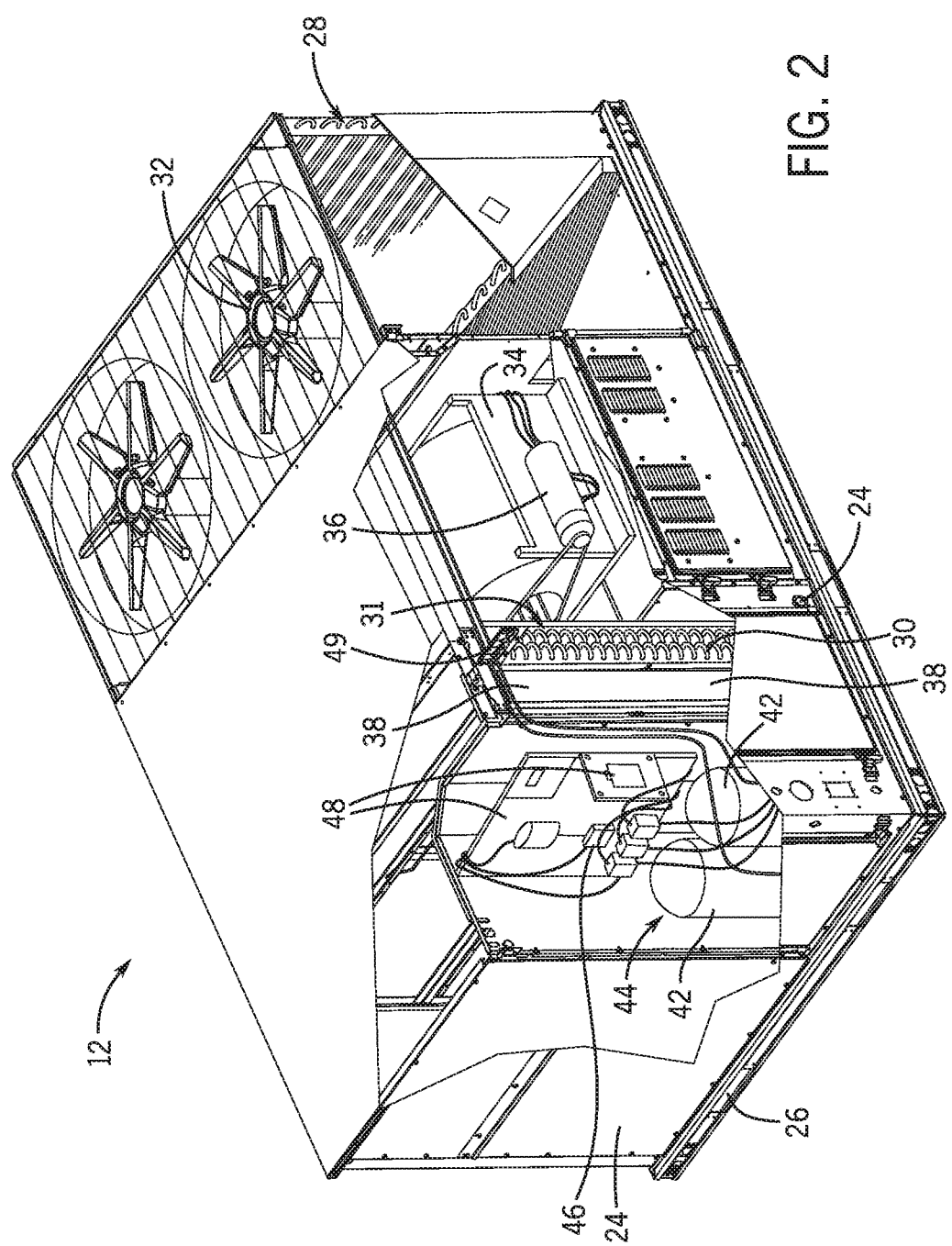
FIG. 2 is a partial cross-sectional view of an embodiment of a packaged HVAC unit, in accordance with aspects of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
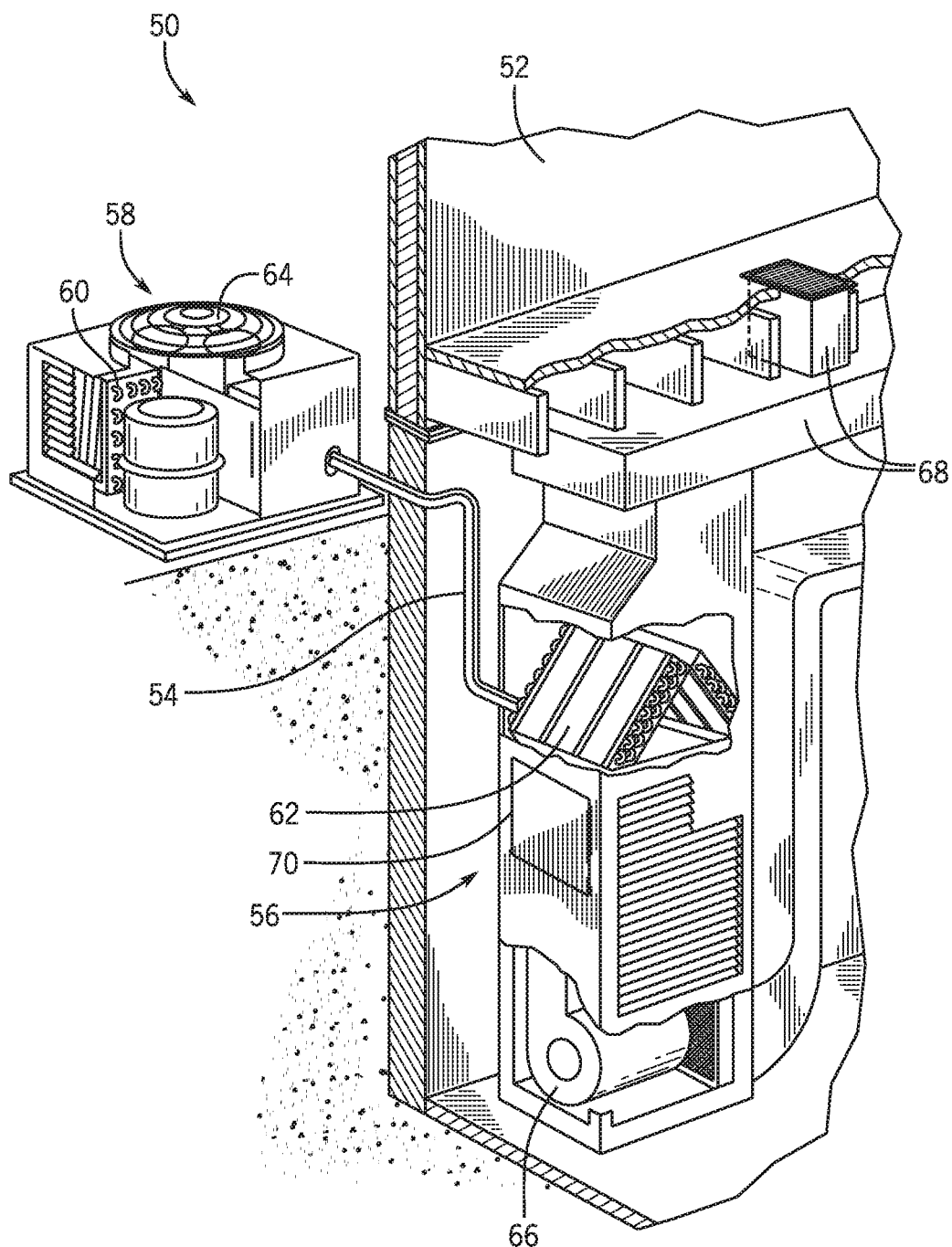
FIG. 3 is a partial cross-sectional view of an embodiment of a split, residential HVAC system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit 56 functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace system 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
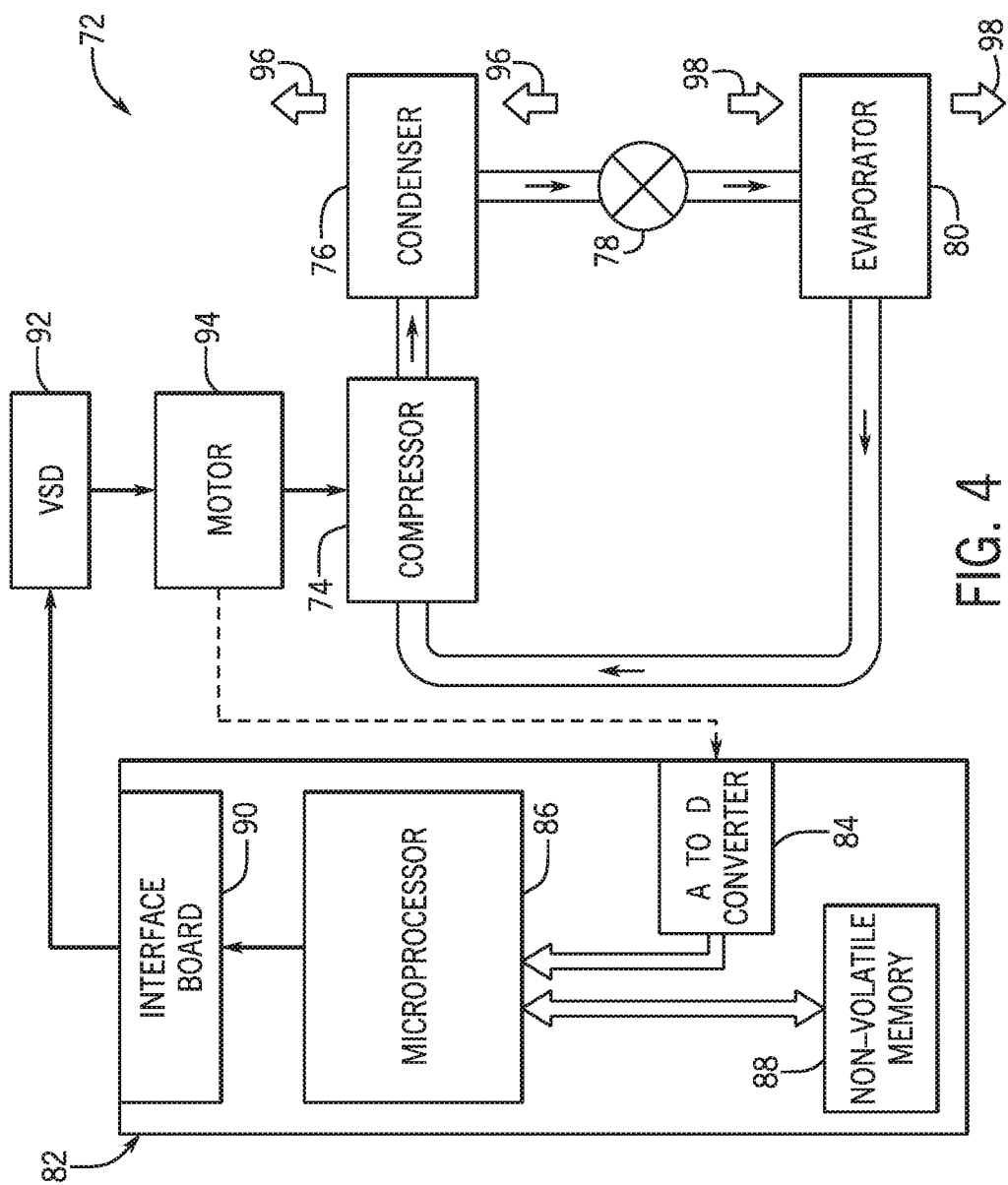
FIG. 4 is a schematic diagram of an embodiment of a vapor compression system that may be incorporated with an HVAC system, in accordance with aspects of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications, and such systems may be of any desired size and/or system capacity, for example, as given by a tonnage.

Figure 5:
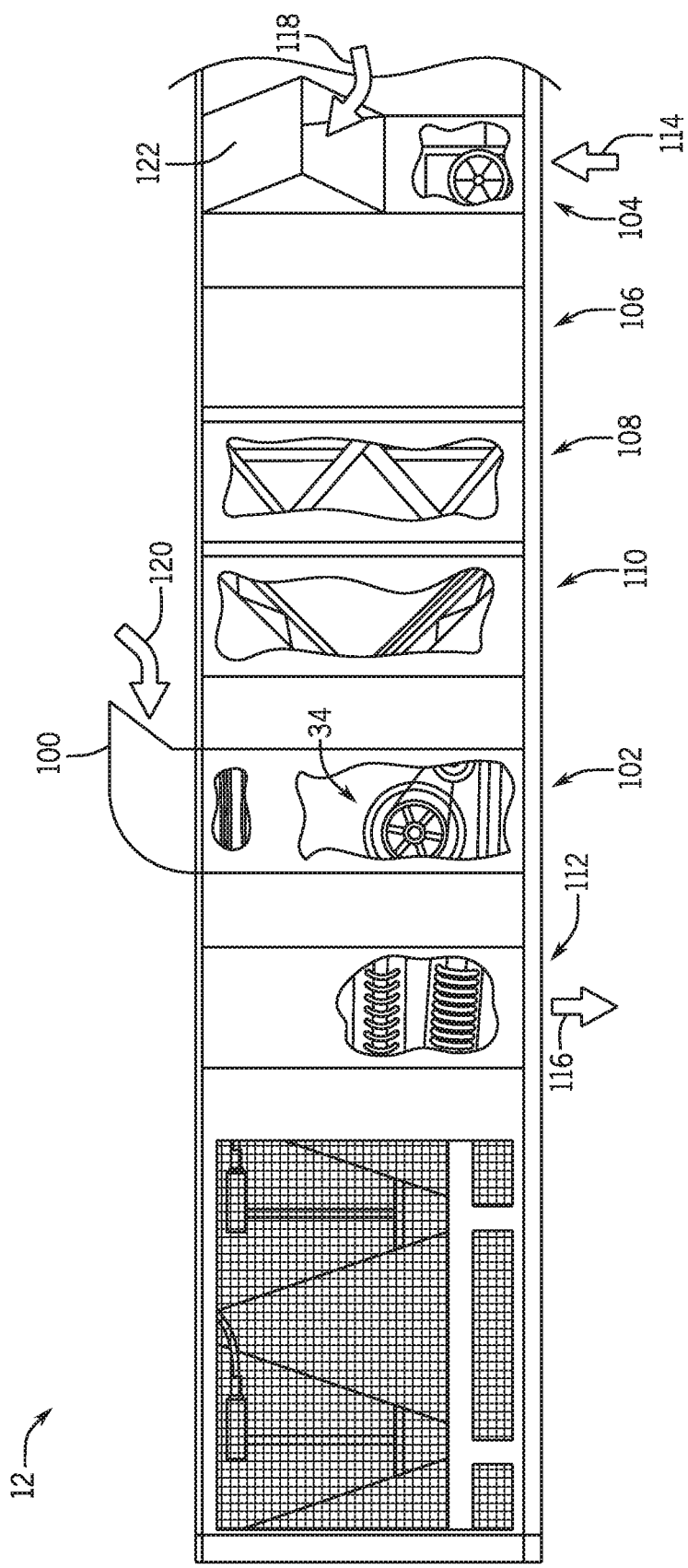
FIG. 5 is a side view of an HVAC unit having an auxiliary economizer, in accordance with aspects of the present disclosure.

As discussed above, the HVAC unit 12 or other HVAC system may include an auxiliary economizer 100 proximate a blower section 102 for increased efficiency of the HVAC unit 12. For example, FIG. 5 is a partial cut-away side view of an embodiment of the HVAC unit 12 having the auxiliary economizer 100. Additionally, the HVAC unit 12 may include one or more other sections in fluid contact with the blower section 102 to facilitate conditioning of air supplied to the building 10. For example, the HVAC unit 12 may include an air intake section 104, an energy recovery section 106, which may house an energy recovery wheel, a filter section 108, a heat exchanger section 110, which may house an evaporator 80 and/or hot gas reheat (HGRH) coils, and/or a plenum section 112. As should be appreciated, the HVAC unit 12 may include more or fewer sections in any suitable order. Additionally or alternatively, the sections may generally define regions where certain components of the HVAC unit 12 are positioned, with or without partitions therebetween. As such, some sections may be combined with or separated from one another, depending on implementation.

In general, a return air flow 114 may enter the air intake section 104, pass through one or more of the sections of the HVAC unit 12, such as the energy recovery section 106, the filter section 108, and/or the heat exchanger section 110, and may then be discharged out of the HVAC unit 12 as a plenum air flow 116 or supply air flow via the plenum section 112. The flow of the air may be facilitated, for example, via a supply fan, such as the blower assembly 34, of a supply fan section, such as the blower section 102. Depending on the mode of operation, the return air flow 114 may be conditioned, for example, via a heat exchanger of the heat exchanger section 110, hot gas reheat coils, and/or an energy recovery wheel of the energy recovery section 106. Additionally or alternatively, a preliminary environmental air flow 118 and/or an auxiliary environmental air flow 120 may be introduced into the HVAC unit 12, for example, at the air intake section 104 or the blower section 102, to ventilate the building and/or facilitate a free-cooling mode of HVAC unit 12 operation.

In some embodiments, the preliminary environmental air flow 118 may enter the HVAC unit 12 via a preliminary economizer 122 and may flow through one or more sections of the HVAC unit 12, such as the heat exchanger section 110, prior to reaching the blower section 102. Additionally or alternatively to the preliminary economizer 122, the auxiliary economizer 100 may be implemented proximate the blower section 102, such as directly adjacent the blower section 102. Moreover, the auxiliary economizer 100 may be closer to the blower section 102 than the preliminary economizer 122. In other words, the auxiliary environmental air flow 120 may enter the HVAC unit downstream, relative to the air flow through the HVAC unit, from the entrance for the preliminary environmental air flow 118. As such, in one embodiment, the preliminary environmental air flow 118 from the preliminary economizer 122 may be conditioned, for example, in the heat exchanger section 110, and the auxiliary environmental air flow 120 from the auxiliary economizer 100 may be introduced into the HVAC unit 12 downstream of the heat exchanger section 110, thereby precluding conditioning of the auxiliary environmental air flow 120. For example, the auxiliary environmental air flow 120 may effectively bypass the evaporator coil by entering the blower section 102 via a parallel flow path to that of the preliminary environmental air flow 118 and/or the return air flow 114. As will be appreciated, in some embodiments, the auxiliary economizer 100 may introduce the auxiliary environmental air flow 120 into the HVAC unit 12 before or upstream of the heat exchanger section 110, for example, to enable conditioning of the auxiliary environmental air flow 120 within the HVAC unit 12. However, in such embodiments, the auxiliary environmental air flow 120 may still be introduced into the HVAC unit 12 downstream, relative to the direction of air flow through the HVAC unit 12, of other sections, such as the energy recovery section 106. Additionally, sections of the HVAC unit 12 that include an economizer may define mixing sections, such as a mixing chamber, within the HVAC unit 12 that enable the mixing of the return air flow 114 and the auxiliary environmental air flow 120 or preliminary environmental air flow 118 within the HVAC unit 12. For example, the air intake section 104 may include a return air inlet and an outdoor air intake such as the preliminary economizer 122, and act as a mixing section for the return air flow 114 and an outdoor air flow such as the preliminary environmental air flow 118. Additionally, the blower section 102 may act as a mixing section for the return air flow 114 and an outdoor air flow such the auxiliary environmental air flow 120.

Since the auxiliary environmental air flow 120 may be introduced into the HVAC unit 12 closer to the blower section 102 than the preliminary environmental air flow 118, the auxiliary environmental air flow 120 may incur less fluidic resistance within the HVAC unit 12 than the preliminary environmental air flow 118. Additionally, by introducing the auxiliary environmental air flow 120 after one or more sections of the HVAC unit 12, the volume of air flow and the velocity of the air flow, such as the return air flow 114, through the bypassed sections may be reduced. The reduced air flow through the bypassed sections may reduce the pressure drop of the air flow through these sections, while maintaining the same volume of air flow for the plenum air flow 116 to the building 10. In this way, operational efficiency of the HVAC unit 12 may be increased. More particularly, with increased air flow efficiency, the total volume of air flow for the plenum air flow 116 may be increased and/or the load, such an electrical current draw, of the blower assembly 34 may be reduced.

Furthermore, in some embodiments, the HVAC unit 12 may include just the auxiliary economizer 100 or both the auxiliary economizer 100 and the preliminary economizer 122. As discussed above, the HVAC unit 12 is operable in one of multiple modes, such as a recirculating mode, an economizer mode, and/or a free-cooling mode. As will be appreciated, the economizer mode and the free-cooling mode may utilize the auxiliary economizer 100 and/or the preliminary economizer 122. In some embodiments, the auxiliary economizer 100 and the preliminary economizer 122 may be implemented on the same HVAC unit 12 but may not be used simultaneously.

Figure 6:
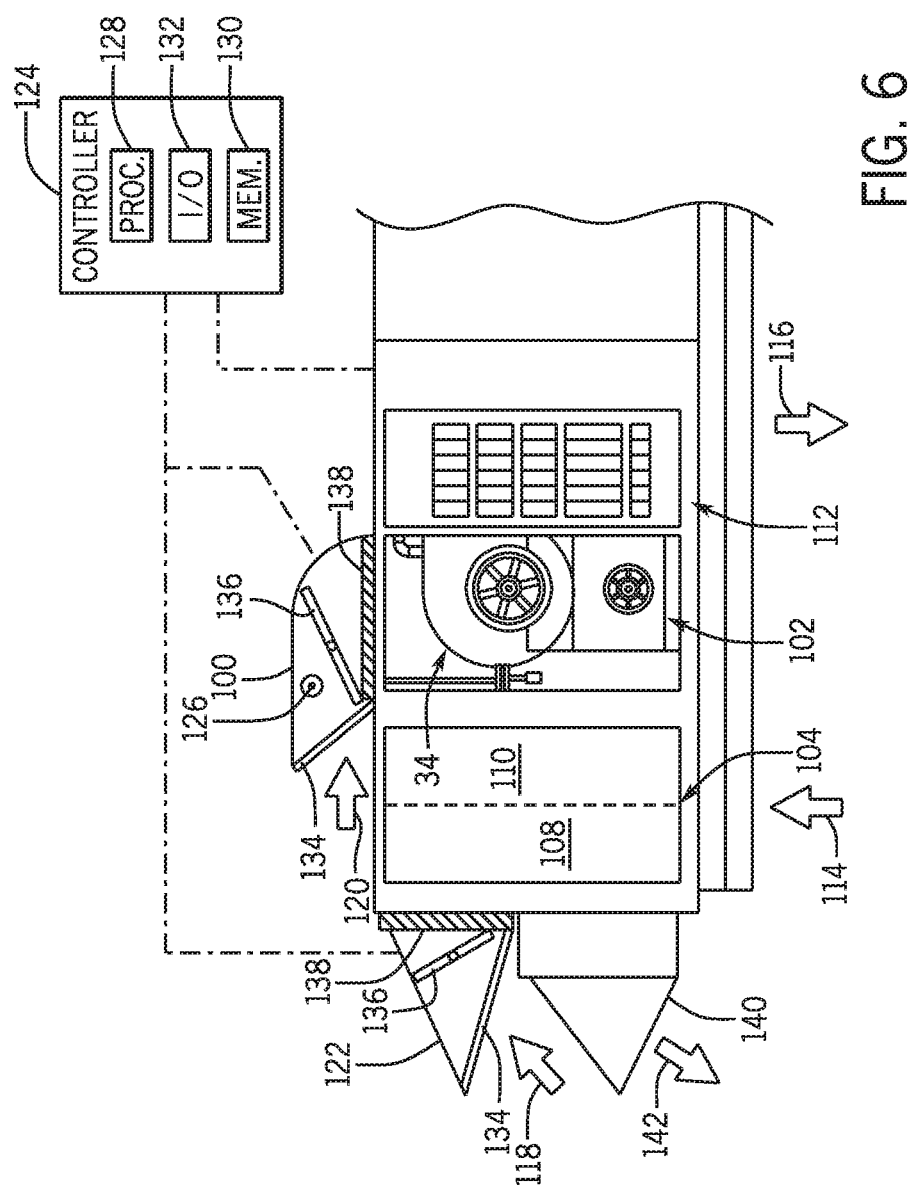
FIG. 6 is a side view of an HVAC unit having an auxiliary economizer and a controller for regulating operation of the HVAC unit, in accordance with aspects of the present disclosure.

In some embodiments, utilization of the auxiliary economizer 100 and/or the preliminary economizer 122 may depend on operating parameters, such as temperature and/or the expended amount of the conditioning capacity of the HVAC unit 12. For example, FIG. 6 is a partial cut-away side view of an embodiment of the HVAC unit 12, illustrating a controller 124 that may control operation of the auxiliary economizer 100 and/or the preliminary economizer 122 based on one or more operating parameters. The operating parameters may include a user setting, which may be received via the control device 16 discussed above, and/or a temperature of the environmental air, which may be received via a temperature sensor 126. As should be appreciated, the temperature sensor 126 may be installed at any suitable location to measure the temperature of the environmental air. Furthermore, a second temperature sensor may be used for determining the temperature of the return air flow 114. For example, the second temperature sensor may be implemented within the air intake section 104, within the ductwork 14, or within the conditioned space, such as a thermostat sensor. The controller 124 may include one or more processors 128, one or more memory devices 130, such as a non-transitory machine readable media, and/or one or more input/output (I/O) interfaces 132, which may be configured to communicate with the control device 16, the temperature sensor 126, the auxiliary economizer 100, and/or the preliminary economizer 122. Furthermore, the controller 124 may be implemented as part of the control panel 82 or may be implemented separately as stand-alone circuitry.

Additionally, the auxiliary economizer 100 and/or the preliminary economizer 122 may each have a grate 134, a damper 136, and/or a filter 138. The grate 134 may be disposed approximate an air inlet of the auxiliary economizer 100 and/or the preliminary economizer 122, for example, to prevent debris from entering the HVAC unit 12. Additionally, the filter 138 may be disposed proximate an air outlet of the auxiliary economizer 100 and/or the preliminary economizer 122, for example, to remove particulates from the incoming environmental air. In some embodiments, the damper 136 may be operated by a motor actuated via the controller 124 to regulate a flow rate of the auxiliary environmental air flow 120 or the preliminary environmental air flow 118 into the HVAC unit 12 via the auxiliary economizer 100 or the preliminary economizer 122, respectively. For example, a position of the damper 136 may be adjusted based on operating mode or other operating parameter to adjustably control how much environmental air is drawn into the HVAC unit 12. In one embodiment, when operating in a free-cooling mode, the damper 136 of the auxiliary economizer 100 may be opened fully, and, when operating in an economizer mode, the damper 136 may be adjusted such that the environmental air is regulated through the air outlet of the auxiliary economizer 100 into the blower section 102 to make up a desired portion of the plenum air flow 116, such as 10 percent, 20 percent, 40 percent, or other desired percentage. Additionally, as discussed above, the HVAC unit 12 may include an exhaust vent 140 for expelling an exhaust air flow 142 from the HVAC unit 12. For example, the exhaust vent 140 may be used to expel excess return air flow 114, as environmental air is drawn into the HVAC unit 12 so as to not over pressurize the conditioned space within the building 10.

Figure 7:
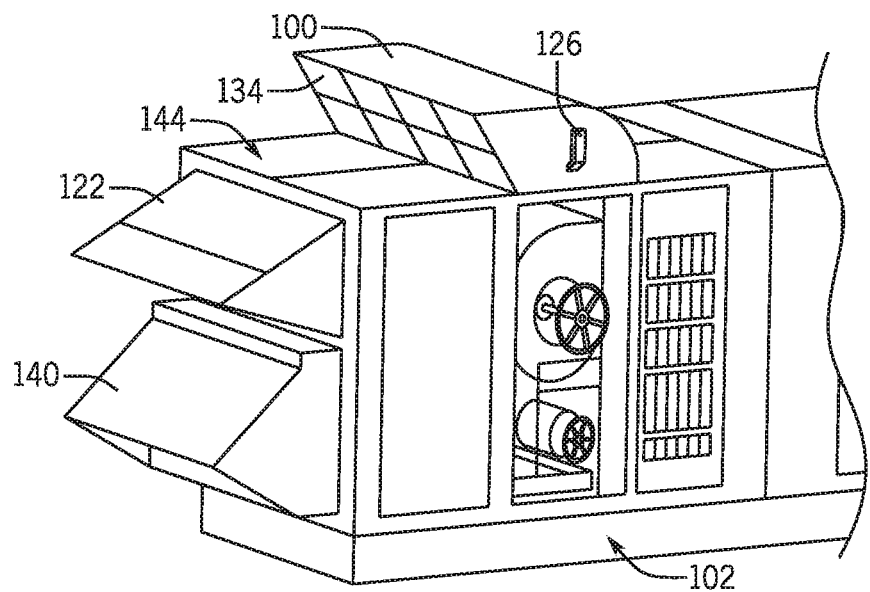
FIG. 7 is a perspective view of an HVAC having an auxiliary economizer, in accordance with aspects of the present disclosure.

Furthermore, in some embodiments, the auxiliary economizer 100 may be implemented on a top surface 144 of the HVAC unit 12, to draw in the auxiliary environmental air flow 120 from above the HVAC unit 12, as depicted in FIG. 7. For example, a top mounted auxiliary economizer 100 may enable low resistance environmental air intake at any desired section of the HVAC unit 12, such as the blower section 102, without increasing the footprint of the HVAC unit 12. In such embodiments, the auxiliary economizer 100 may include one grate 134, one damper 136, and one filter 138. However, in other embodiments, the top mounted auxiliary economizer 100 may include multiple grates 134, dampers 136, and/or filters 138.

Figure 8:
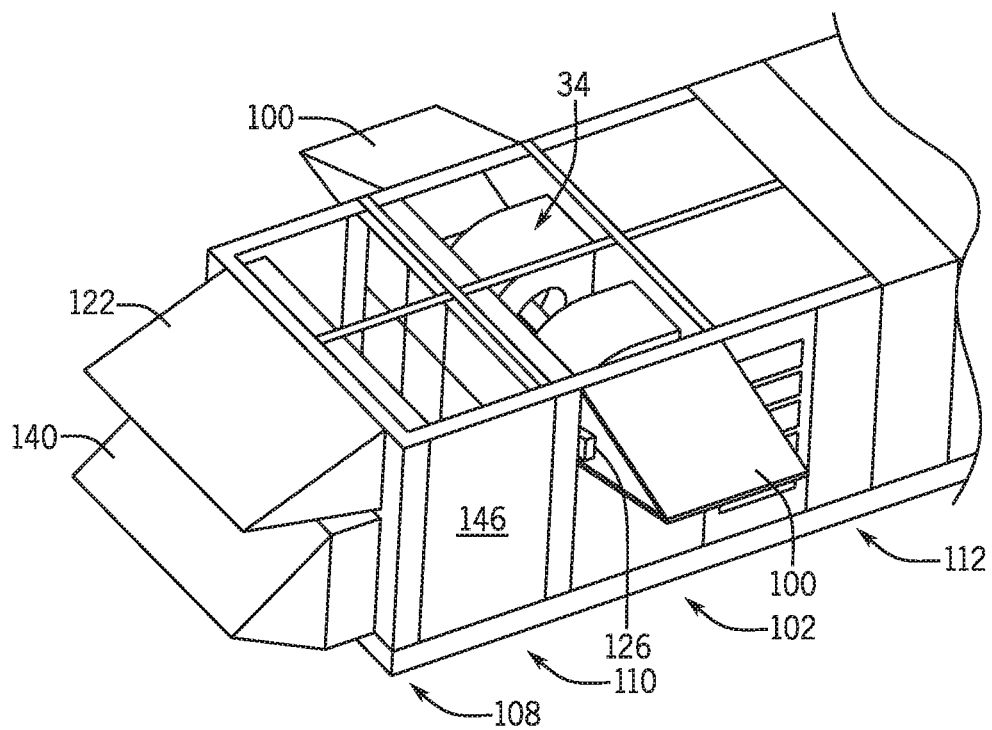
FIG. 8 is a perspective view of an HVAC having an auxiliary economizer, in accordance with aspects of the present disclosure.

Moreover, in some embodiments, the auxiliary economizer 100 may draw air from one or more side surfaces 146 of the HVAC unit 12, as depicted in FIG. 8. For example, one or more side mounted auxiliary economizers 100 may also enable low resistance environmental air intake at any desired section of the HVAC unit 12, without increasing the vertical size of the HVAC unit 12. In the illustrated embodiment, two side mounted auxiliary economizers 100 are coupled to the HVAC unit 12 proximate the blower section 102 and are each configured to direct auxiliary environmental air flow 120 into the blower section 102. In such embodiments, each auxiliary economizer 100 includes a respective grate 134, damper 136, and filter 138. The respective damper 136 of each auxiliary economizer 100 may be controlled in conjunction with one another or separately from one another, in accordance with the techniques described herein. In either the top mounted configuration or the side mounted configuration, the auxiliary economizer 100 enables intake of the auxiliary environmental air flow 120 into the HVAC unit 12 proximate the blower section 102, such that the auxiliary environmental air flow 120 does not traverse other sections, such as the heat exchanger section 110, within the HVAC unit 12 before the auxiliary environmental air flow 120 is supplied to a conditioned space.

Additionally, in some embodiments, the auxiliary economizer 100 may be retrofitted to an existing HVAC unit 12. For example, one or more panels of the HVAC unit 12 may be cut, modified, or replaced to mount the auxiliary economizer 100 to the HVAC unit 12 and to receive the auxiliary environmental air flow 120 into the HVAC unit 12. Additionally, the controller 124 of the auxiliary economizer 100 may be coupled to the control panel 82 and/or the preliminary economizer 122 to facilitate operation of the auxiliary economizer 100.

Figure 9:
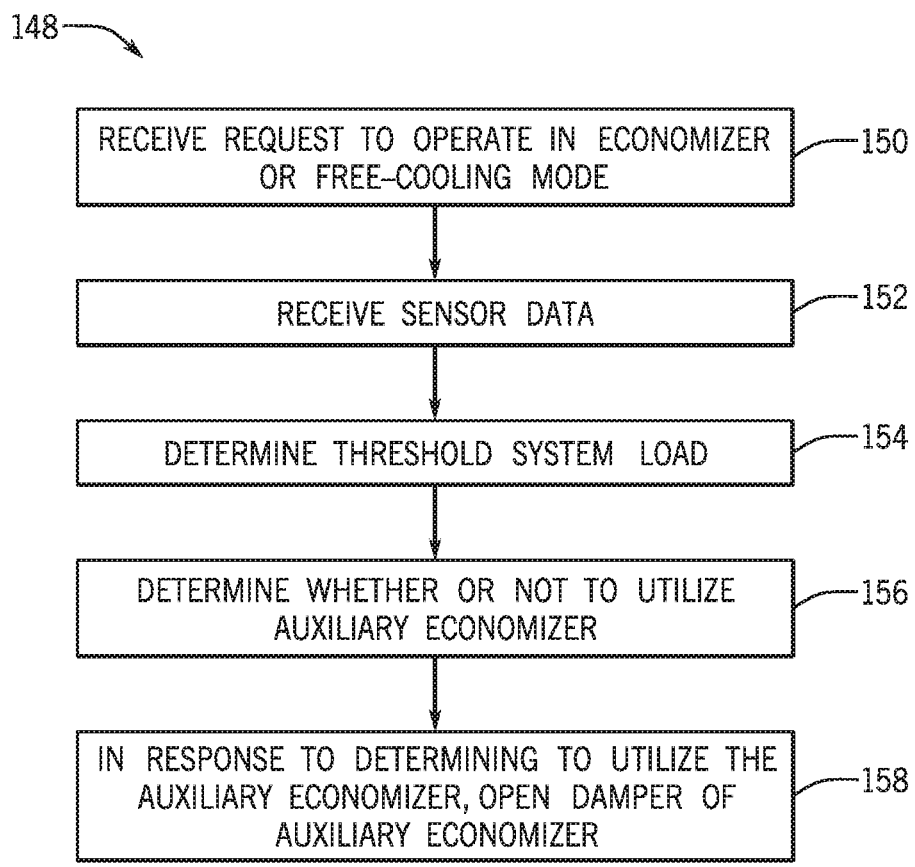
FIG. 9 is a flowchart of a process for operating the auxiliary economizer of an HVAC system, in accordance with aspects of the present disclosure.

FIG. 9 is a flowchart 148 of a process for operating of the auxiliary economizer 100. The process may include receiving a request, for example into the controller 124, to operate the HVAC unit 12 in the economizer mode or the free-cooling mode, as indicated by process block 150. In some embodiments, such a request may be made, for example, via the control device 16. The controller 124 may also receive sensor data, as indicated by process block 152. Such sensor data may include, but is not limited to, the temperature of the environmental air obtained via the temperature sensor 126 and/or an electrical loading of the compressor 74. Additionally, a threshold system load may be determined, as indicated by process block 154, such as via the controller 124, for comparison to the current system capacity utilization. Moreover, it may be determined whether or not to utilize the auxiliary economizer 100, as indicated by process block 156. For example, the controller 124 may determine whether or not to utilize the auxiliary economizer 100 based on the sensor data received at process block 152 and/or based on the system capacity comparison discussed with reference to process block 154. If auxiliary economizer 100 operation is desired, the damper 136 of the auxiliary economizer 100 may be opened, as indicated by process block 158.

As discussed above, when operating in the economizer mode or free-cooling mode, the respective damper 136 of the auxiliary economizer 100 or the preliminary auxiliary economizer 122 may be opened, and the auxiliary environmental air flow 120 or the preliminary environmental air flow 118 may be admitted to the HVAC unit 12, respectively. In some scenarios, it may be desirable to utilize the auxiliary economizer 100 over the preliminary economizer 122 or vice versa. For example, in some embodiments, the auxiliary environmental air flow 120 may not be conditioned by the HVAC unit 12, because the auxiliary economizer 100 is located downstream, with respect to the air flow through the HVAC unit 12, of the heat exchanger section 110. As such, above a threshold system load, for example greater than 50 percent, greater than 75 percent, or at 100 percent of the conditioning capacity of the HVAC unit 12, it may be desirable to condition the entirety of the plenum air flow 116 supplied to the conditioned space, including conditioning of the return air and/or the environmental air. In such a case, the preliminary economizer 122 may be opened, and the preliminary environmental air flow 118 may be conditioned within the HVAC unit 12. However, when operating below the threshold system load, for example less than 100 percent, less than 75 percent, or less than 50 percent of the HVAC unit 12 conditioning capacity, the auxiliary economizer 100 may be utilized to facilitate the auxiliary environmental air flow 120 into the HVAC unit 12. The current system capacity utilization may be determined, for example, based on the loading of a conditioning component. For example, the utilized capacity of the HVAC system may correspond to the compressor load. Below the threshold system load, the increased efficiency of the air flow through the HVAC unit 12 may outweigh the lack of conditioning of the auxiliary environmental air flow 120. For example, for a given volume of plenum air flow 116 and ratio of environmental air flow 118, 120 to return air flow 114, the reduced electrical load of the blower assembly 34 enabled by utilization of the auxiliary economizer 100 may yield a conditioning cost, such as British Thermal Unit (BTU) per Watt hour (BTU/(W*h)), less than if the preliminary economizer 122 is used. As such, the auxiliary economizer 100 may increase the conditioning efficiency of the plenum air flow 116 and, thus, the HVAC unit 12.

As discussed above, the determination of whether or not to utilize the auxiliary economizer 100 may be based on the threshold system load. Additionally, the threshold system load may dynamically change depending on the temperature of the environmental air flow 118, 120 and/or the return air flow 114. For example, a colder environmental air flow 118, 120 may increase the threshold system load during cooling operations, relative to a warmer environmental air flow 118, 120, due to the fact that the environmental air flow 118, 120 is already at a cooler temperature. As such, sensor data including temperature measurements from one or more temperature sensors 126 may be gathered to determine the threshold system load. Additionally, sensor data may be used to estimate the current system capacity utilization. As such, in some embodiments, the current system capacity utilization may be compared to the threshold system load to determine if the auxiliary economizer 100 should be used. If use of the auxiliary economizer 100 is not desired, such as when the current system capacity utilization is greater than the threshold system load, the preliminary economizer 122 may be used instead, if equipped. Moreover, in some embodiments, the threshold system load may be a set value that does not dynamically change with temperature. As such, if the current system capacity utilization is less than the threshold system load, the auxiliary economizer 100 may be used.

Additionally, when operating in the free-cooling mode, the HVAC unit 12 may not actively condition the air flow directed through the HVAC unit 12. As such, little or no air flow through the heat exchanger section 110 may occur. For example, when operating in the free-cooling mode, plenum air flow 116 may consist of, at least in the majority, the auxiliary environmental air flow 120 drawn into the HVAC unit 12 via the auxiliary economizer 100. Furthermore, in the free-cooling mode, the current system capacity utilization may be effectively zero, and, as such, the determination to use the auxiliary economizer 100, for example instead of the preliminary economizer 122, may be made in response to operating in the free-cooling mode, without comparison of the current system capacity utilization to a threshold system load and/or temperature measurements. Furthermore, although the above referenced flowchart 148 is shown in a given order, in certain embodiments, the depicted steps may be reordered, altered, deleted, and/or occur simultaneously. Additionally, the referenced flowchart 148 is given as an illustrative tool, and further decision and/or process blocks may be added depending on implementation.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A heating, ventilation, and/or air conditioning (HVAC) unit, comprising:
 a supply fan configured to force a supply air flow through a discharge plenum of the HVAC unit;
 an economizer positioned proximate the supply fan, wherein the economizer is configured to receive an outdoor air flow and direct the outdoor air flow toward the supply fan, such that the outdoor air flow bypasses an evaporator coil of the HVAC unit; and
 a mixing chamber having a return air inlet and an outdoor air intake, wherein the mixing chamber is fluidly coupled to the supply fan, wherein the mixing chamber is configured to mix a first air flow from the return air inlet and a second air flow from the outdoor air intake, and wherein the evaporator coil is disposed downstream of the mixing chamber and upstream of the supply fan.

2. The HVAC unit of claim 1, wherein the economizer is configured to facilitate the outdoor air flow directly to the supply fan.

3. The HVAC unit of claim 1, wherein the mixing chamber forms a first air flow path toward the supply fan, and the economizer forms a second air flow path toward the supply fan, separate from the first air flow path.

4. The HVAC unit of claim 1, wherein the economizer is a first economizer, and the outdoor air intake is a second economizer.

5. The HVAC unit of claim 1, wherein the economizer is affixed to a top surface of the HVAC unit.

6. The HVAC unit of claim 1, wherein the economizer is affixed to a side surface of the HVAC unit.

7. The HVAC unit of claim 1, comprising a controller configured to regulate operation of the economizer based on an operating mode of the HVAC unit, a conditioning capacity utilization of the HVAC unit, a temperature of the outdoor air flow, or a combination thereof.

8. The HVAC unit of claim 1, wherein the economizer includes a damper, and wherein the damper is configured to be adjusted to regulate an amount of the outdoor air flow directed toward the supply fan.

9. The HVAC unit of claim 8, wherein the damper is fully open during a free-cooling mode of the HVAC unit.

10. The HVAC unit of claim 7, wherein the controller is configured to determine the conditioning capacity utilization based on a compressor load.

11. The HVAC unit of claim 7, wherein the controller is configured to compare the conditioning capacity utilization to a threshold system load to determine whether the economizer should be utilized.

12. An economizer, comprising:
    an air inlet configured to receive an environmental air flow;
    an air outlet configured to direct the environmental air flow into a heating, ventilation, and/or air conditioning (HVAC) unit proximate a blower section of the HVAC unit, such that the environmental air flow bypasses an evaporator coil of the HVAC unit prior to being discharged via a plenum section of the HVAC unit;
    a damper configured to regulate a flow rate of the environmental air flow from the air inlet to the air outlet; and
    a controller configured to regulate a position of the damper, wherein the controller is configured to open the damper when the HVAC unit is operated at a first conditioning capacity utilization less than a threshold value, and the controller is configured to open a second damper of a second economizer of the HVAC unit when the HVAC unit is operated at a second conditioning capacity utilization greater than the threshold value.

13. The economizer of claim 12, wherein the controller is configured to determine the threshold value based on a temperature of the environmental air flow.

14. The economizer of claim 12, wherein the controller is configured to close the damper of the economizer based on the second conditioning capacity utilization being greater than the threshold value.

15. The economizer of claim 12, wherein the HVAC unit is an existing HVAC unit, and the economizer is configured to be retrofitted to the existing HVAC unit.

16. The economizer of claim 12, comprising a filter proximate the air outlet.

17. The economizer of claim 12, wherein the controller is configured to determine the first conditioning capacity utilization based on a compressor load of the HVAC unit or a blower motor load of a blower of the blower section.

18. The economizer of claim 12, wherein the second damper is configured to direct a second environmental air flow to the evaporator coil of the HVAC unit.

19. A heating, ventilation, and/or air conditioning (HVAC) unit, comprising:
    a first economizer configured to direct a first environmental air flow into an air flow path of the HVAC unit;
    a second economizer configured to direct a second environmental air flow into the air flow path; and
    a conditioning section including an evaporator coil, wherein the conditioning section is disposed between the first economizer and the second economizer, relative to a direction of air flow through the air flow path, wherein the evaporator coil is configured to condition the air flow.

20. The HVAC unit of claim 19, wherein the second economizer is positioned adjacent to a blower section of the HVAC unit.

21. The HVAC unit of claim 19, wherein the first economizer is configured to direct the first environmental air flow to an energy recovery wheel, a hot gas reheat coil, or both prior to the conditioning section.

22. The HVAC unit of claim 19, wherein the first economizer includes a first damper, and the second economizer includes a second damper.

23. The HVAC unit of claim 22, comprising a controller configured to regulate respective positions of the first damper and the second damper, wherein the controller is configured to open the first damper and close the second damper based on opening of the first damper, and the controller is configured to open the second damper and close the first damper based on opening of the second damper.

24. The HVAC unit of claim 22, comprising a controller configured to regulate respective positions of the first damper and the second damper, wherein the controller is configured to open the first damper when the HVAC unit is operated at a first conditioning capacity utilization greater than a threshold value, and the controller is configured to open the second damper when the HVAC unit is operated at a second conditioning capacity utilization less than the threshold value.

25. The HVAC unit of claim 24, wherein the threshold value is determined, via the controller, based on an environmental air temperature.

* * * * *